United States Patent

Shen et al.

[11] Patent Number: 6,055,017
[45] Date of Patent: Apr. 25, 2000

[54] ADAPTIVE SCANNING TECHNIQUE FOR EFFICIENT WAVELET VIDEO CODING

[75] Inventors: Sheng Mei Shen; Thiow Keng Tan, both of Singapore, Singapore

[73] Assignee: Matsushita Electric Industrial Co., Ltd., Osaka, Japan

[21] Appl. No.: 08/820,159

[22] Filed: Mar. 19, 1997

[30] Foreign Application Priority Data

Mar. 22, 1996 [JP] Japan ................................ 8-093289

[51] Int. Cl.⁷ .......................... H04N 1/415; H04N 7/50
[52] U.S. Cl. .................. 348/398; 348/437; 348/438; 348/390; 348/384; 382/240
[58] Field of Search ................... 348/397, 398, 348/399, 405, 408, 424–425, 437–438, 384, 390; 382/240, 232, 245–246; H04N 1/415, 7/50

[56] References Cited

U.S. PATENT DOCUMENTS

| | | | |
|---|---|---|---|
| 5,396,237 | 3/1995 | Ohta | 341/50 |
| 5,721,822 | 2/1998 | Agarwal | 395/200.18 |
| 5,777,678 | 7/1998 | Ogata et al. | 348/398 |
| 5,798,794 | 8/1998 | Takahashi | 348/398 |
| 5,808,683 | 9/1998 | Tong et al. | 348/398 |
| 5,812,788 | 9/1998 | Agarwal | 348/405 |
| 5,892,545 | 4/1999 | Saunders et al. | 348/390 |

FOREIGN PATENT DOCUMENTS

6-65815 of 1994 Japan .................. H04N 7/30

OTHER PUBLICATIONS

Sheng–Mei Shen et al., "Wavelet Coefficients Scanning Methods for Video Coding", pp. 1–14, Sep. 1993 (translation of Japanese Application 6–65815).

Sheng–Mei Shen et al., "Scanning Methods for Wavelet Coefficients in Video Coding", *MoMuC–1 First International Workshop on Mobile Multimedia Communications*, pp. B.17-1–B.17-12 (Dec. 1993).

*Primary Examiner*—Vu Le
*Attorney, Agent, or Firm*—Ratner & Prestia

[57] ABSTRACT

A wavelet video coding method using adaptive scanning includes subjecting the input video signal to a horizontal and a vertical wavelet decomposition to obtain base, horizontal, vertical and diagonal bands of wavelet coefficients; recursively subjecting the resulting base band to further wavelet decomposition to obtain lower layers of base, horizontal, vertical and diagonal bands of wavelet coefficients; grouping the co-sited coefficients from the different layers of horizontal, vertical and diagonal bands into horizontal, vertical and diagonal macro-bands, respectively; adaptively quantizing the above coefficients in the horizontal, vertical and diagonal macro-bands, respectively; adaptively scanning and differentially coding the quantized coefficients in the macro-bands into one dimensional arrays, using a technique which depends on the orientation of the macro-bands and the distribution of the coefficients, and entropy coding each of the arrays.

12 Claims, 9 Drawing Sheets

Figure 8 An Encoder of HVDS with DPCM & Adaptive Scan

ADAPTIVE SCANNING TECHNIQUE FOR EFFICIENT WAVELET VIDEO CODING

BACKGROUND OF THE INVENTION

1. Industrial Fields of the Invention

This invention relates to wavelet decomposition, especially to wavelet based video coding.

2. Related Art of the Invention

Besides DCT (Digital Cosine Transform) used in video coding, recently wavelet transform has been widely studied in video signal coding, since wavelet decomposition has spatio-frequency localization properties.

Wavelet transform is an alternative representation of image data. It decomposes an input raster image hierarchically in the vertical and horizontal direction, and forms many different multiresolution bands.

Figure 1:
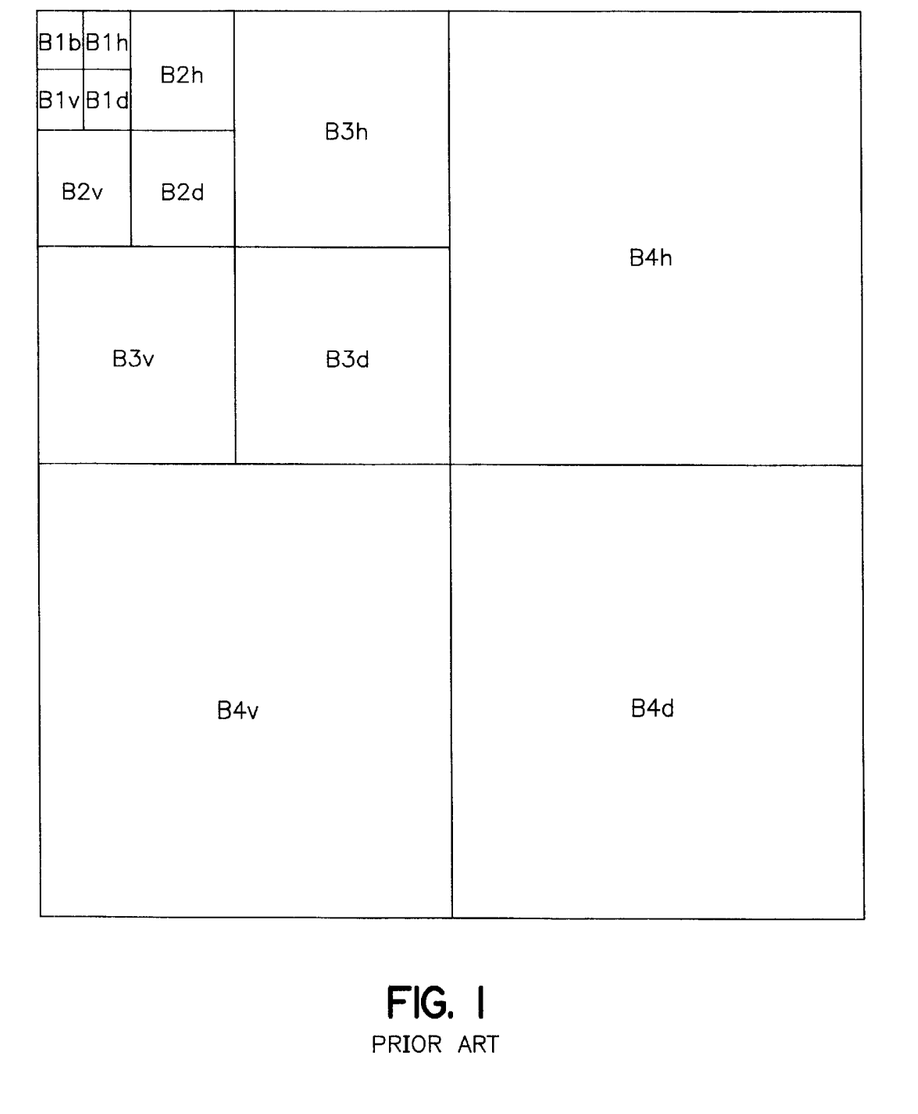
FIG. 1 shows wavelet decomposion with 13 bands after 4 times of decomposition.

FIG. 1 illustrates an example, wavelet decomposition process, where an input image is decomposed into 13-band of wavelet coefficient, after 4 times of decomposition.

The three B4 bands are obtained from the first horizontal/vertical wavelet decomposition; the three B3 bands are obtained from the second decomposition; and so on. The lower bands B1, B2, and B3 contain much of the information of the original image, and the higher band B4 contributes detailed information to the original image.

Figure 2:
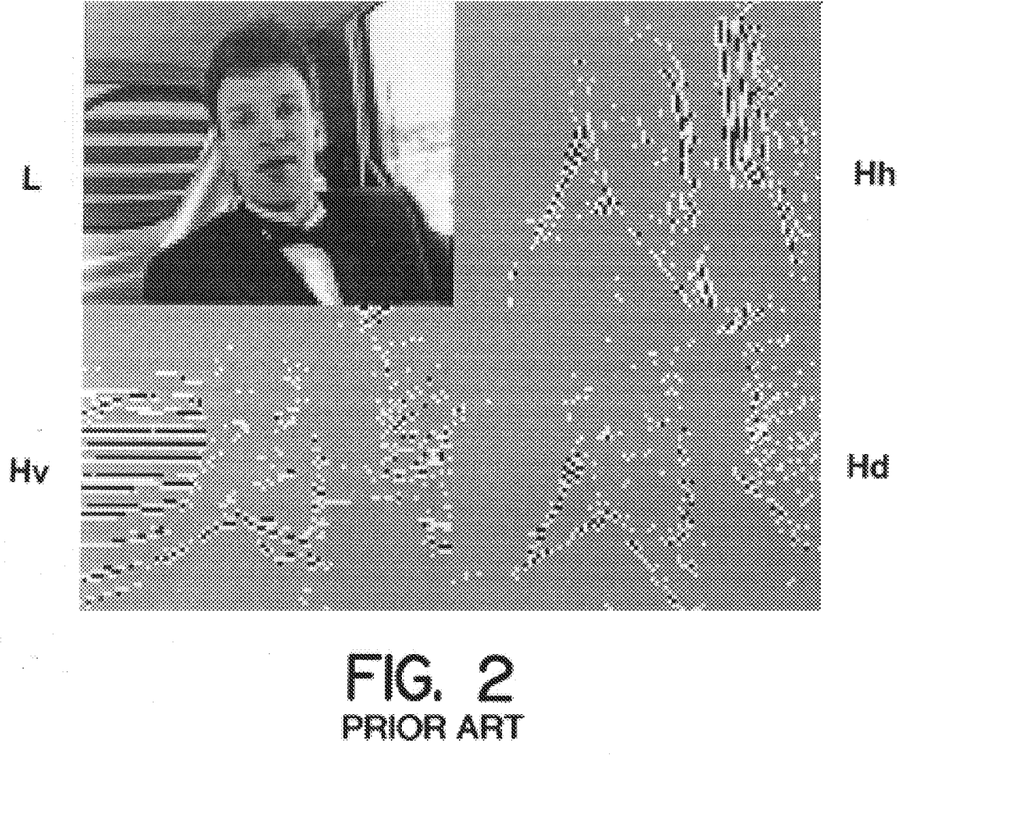
FIG. 2 is an example of the distribution of wavelet coefficients for carphone sequence.

FIG. 2 shows the real wavelet coefficients for Carphone Sequence, which is decomposed once by wavelet transform. It can be seen that there are some non-zero wavelet coefficients vertically distributed in the horizontal band, Hh, because of vertical edges in the original image, and some non-zero wavelet coefficients horizontally distributed in the vertical band, Hv, because of horizontal edges in the original image.

It has been known that if those non-zero wavelet coefficients in FIG. 2 could be represented and coded by using less bits, then the efficiency of the wavelet compression would be high.

In the paper "Wavelet Coefficients Scanning Methods for Video Coding", three scanning methods for wavelet coefficients were presented. One of them is called H_Band/V_Band/D_Band Scan, which is the best scan among the three scanning methods.

Figure 3:
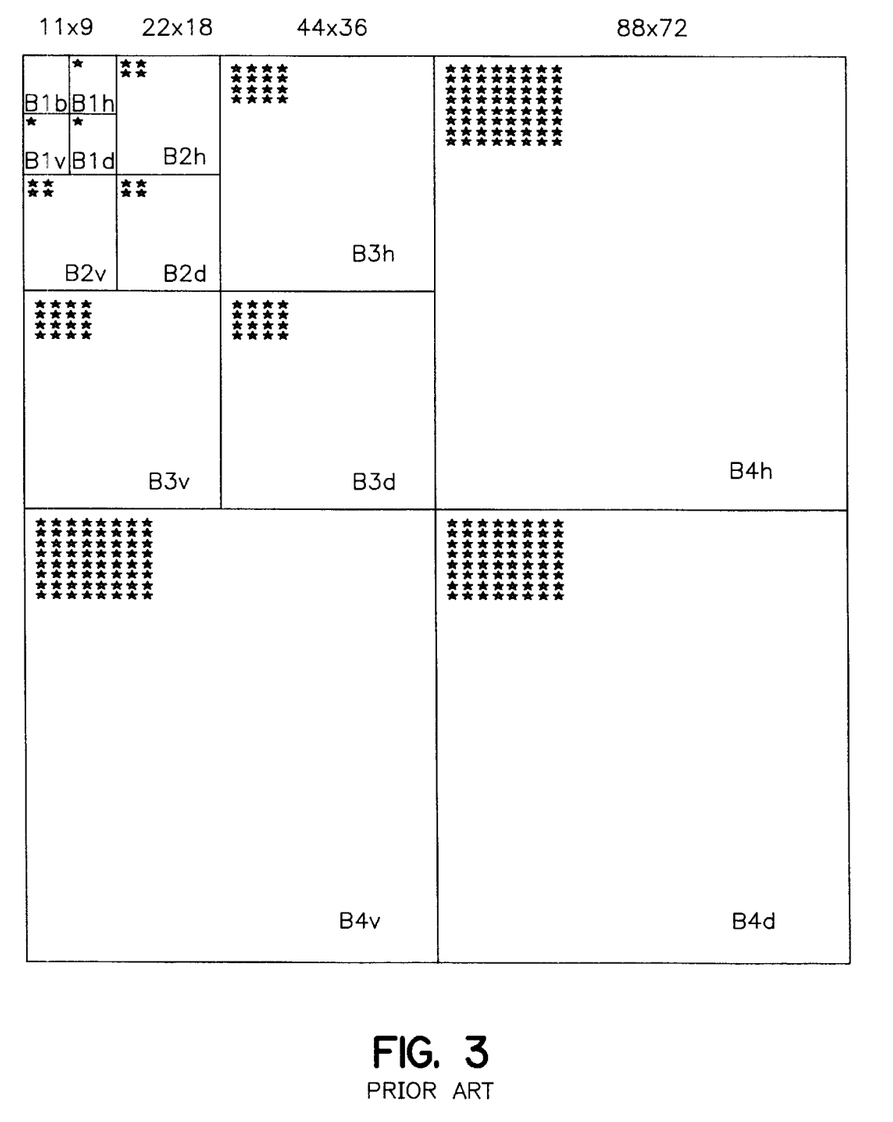
FIG. 3 is an illustration of H_Band/V_Band/D_Band Scan.

FIG. 3 illustrates the scanning mechanism for H_Band/V_Band/D_Band Scan.

Firstly wavelet coefficients are divided into three kinds of bands: horizontal band, vertical band, and diagonal band. Within the horizontal bands, B1h, B2h, B3h, and B4h, different number of wavelet coefficients are taken from different horizontal bands, one from B1h, 2×2 from B2h, 4×4 from B3h, 8×8 from B4h, and then they are grouped into a macro band with total number of 85 items. Finally the macro band is quantized and Huffman VLC coded.

Figure 4:
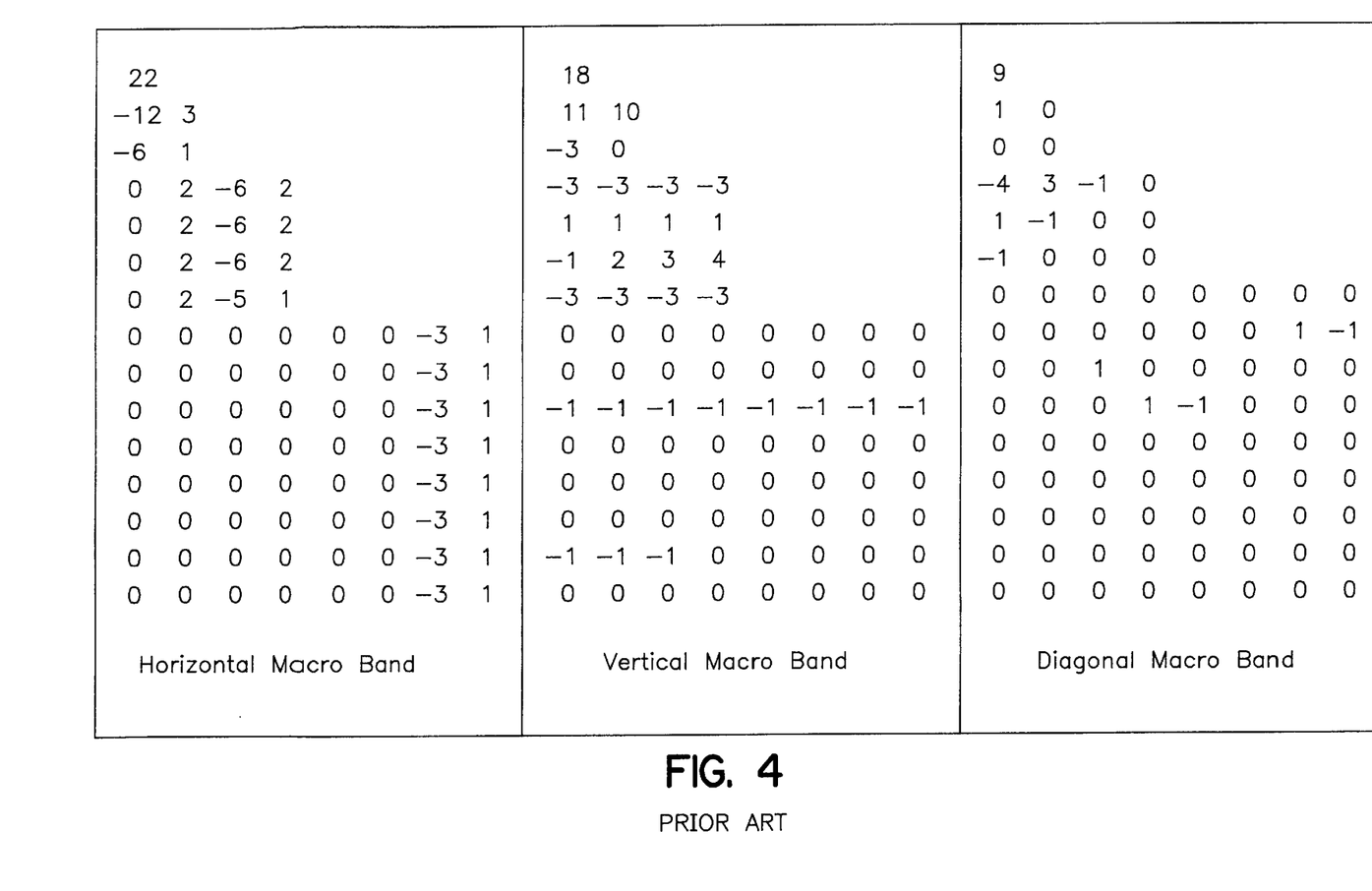
FIG. 4 shows a real case of horizontal macro band, vertical macro band, and diagonal macro band for Carphone Sequence.

FIG. 4 shows an example of three macro bands to be formed from horizontal bands, vertical bands, and diagonal bands, respectively. In the same paper "Wavelet Coefficients Scanning Methods for Video Coding", one dimension array will be further formed just by using normal raster scan no matter what band it is from. But it can be seen from FIG. 4 that in the horizontal band, there are a lot of cases where non-zero wavelet coefficients are vertically distributed, and inversely in the vertical band, there are a lot of cases where non-zero wavelet coefficients are horizontally distributed.

So if the situation could be considered, scanning wavelet coefficients vertically in horizontal bands and scanning wavelet coefficients horizontally in vertical bands, instead of raster scan, then the coding efficiency would be increased further.

In the same time, since a run-length Huffman VLC like entropy encoder will be applied to the array here, if non-zero wavelet coefficients in the array appear as the front of the array as much as possible, as well as to be small as much as possible, then less bits will be consumed.

The invention here is going to propose an adaptive scanning and differential pulse-code modulation (DPCM) process for the H_Band/V_Band/D_Band Scan to improve its coding efficiency further, and the concept is also applicable to the similar cases where wavelet or subband decomposition is used and non-zero coefficients appear vertically in horizontal bands and horizontally in vertical bands.

Wavelet coding is composed of Wavelet Decomposition, Scanning, Quantizaition, as well as entropy coding. Besides choosing a better wavelet transform, scanning and quantising wavelet coefficients efficiently is also very important.

Edge information in an original image is often corresponding to non-zero wavelet coefficients after wavelet decomposition, and normally these coefficients are vertically distributed in horizontal bands and horizontally distributed in vertical bands. The invention is trying to make use of the phenomena to scan wavelet coefficients adaptively, so as to improve the coding efficiency of wavelet.

Further, it is shown that non-zero wavelet coefficients are distributed in different vertical line for different images, taken horizontal macro band as an example shown in FIG. 4. In order to use less bits to code them by Huffman VLC like entropy coder, those non-zero coefficients are needed to scan and put in the front of a 1-Dimension array as much as possible.

There are a lot of cases where wavelet coefficients in the same vertical line for horizontal band have the same value, at least have the same sign. So one dimension of DPCM coding could be used here for reducing the redundancy between neighbour coefficients.

SUMMARY OF THE INVENTION

In this invention wavelet coefficients are scanned vertically for a horizontal band, horizontally scanned for a vertical band, and zig-zag for a diagonal band.

Non-zero wavelet coefficients are scanned and put in the front of an array as much as possible by searching the first vertical line with non-zero coefficients in its first value in horizontal bands, and the first horizontal line with non-zero coefficients in its first value in vertical bands.

DPCM coding is done vertical within a vertical line for a horizontal band, and horizontally done within a horizontal line for a vertical band.

Hereinafter the operation of the present invention is described.

An input image is decomposed by wavelet transform, quantized by using different quantization step. H_and/V_Band/D_Band scan is applied here.

In the meantime, for horizontal bands each of 1-D array is obtained after using one dimensional DPCM coding within a vertical line, searching the first vertical line with non-zero coefficients in its first value, and scanning all the coefficients vertically, and for vertical bands each of 1-D array is obtained after using one dimensional DPCM within a horizontal line, searching the first horizontal line with non-zero coefficients in its first value, and scanning all the coefficients horizontally.

For diagonal bands, a conventional zig-zag scan is applied directly.

Then Huffman VLC coding can be used to code each of array obtained from above-mentioned method.

PREFERRED EMBODIMENTS

The preferred embodiment of the present invention would be best explained by following FIGS. 5, 6, 7, and 8.

Figure 5:
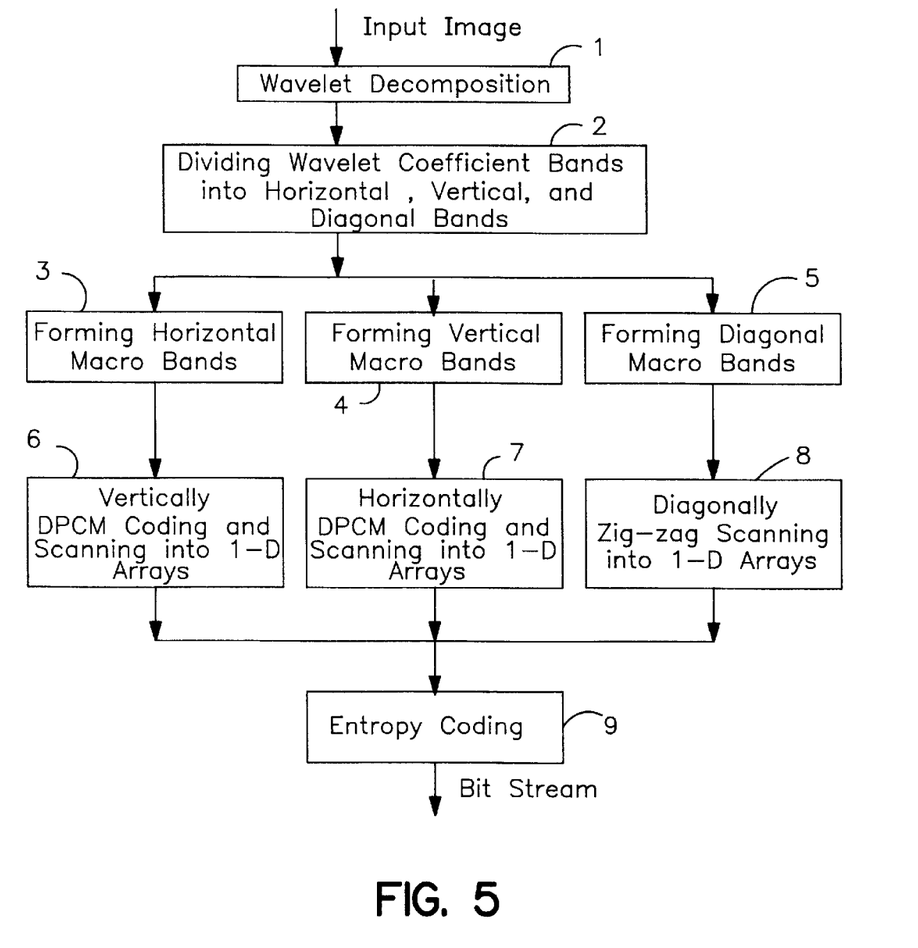
FIG. 5 is a general diagram of H_Band/V_Band/D_Band with DPCM & Adaptive Scanning.

FIG. 5 is a general diagram for H_Band/V_Band/D_Band scan, where wavelet transform in unit 1 is applied to an input image, in unit 2 wavelet coefficients for whole frame are divided into horizontal band, vertical band and diagonal band. Then in unit 3 horizontal macro bands will be obtained by taking one coefficient from B1h, 2×2 coefficients from B2h, 4×4 coefficients from B3h, and 8×8 coefficients from B4h, as shown in FIG. 3 for horizontal bands; in unit 4 vertical macro bands will be obtained by taking one coefficients from B1v, 2×2 from B2v, 4×4 from B3v, and 8×8 from B4v for vertical bands; in unit 5 diagonal macro bands will be obtained by taking one coefficients from B1d, 2×2 from B2d, 4×4 from B3d, and 8×8 from B4d for diagonal bands.

In units 6, 7 and 8 many 1-D arrays will be formed from the unit 3, unit 4, and unit 5, respectively, by use of the current differential pulse-code modulation (DPCM) & Adaptive scan, which will be explained in FIG. 6 in detail.

In unit 9 an entropy coding is applied to code each of 1-D array formed in the units 6, 7, and 8.

Figure 6:
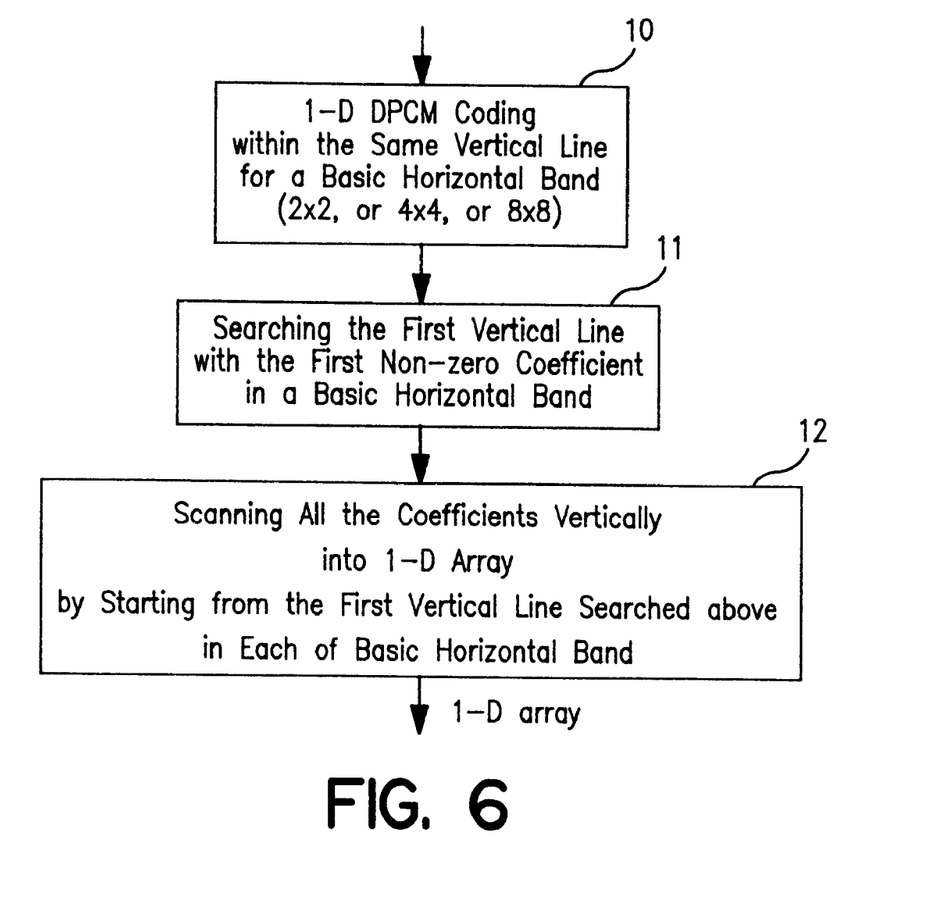
FIG. 6 shows the details of DPCM & Adaptive Scanning.
Figure 7A:
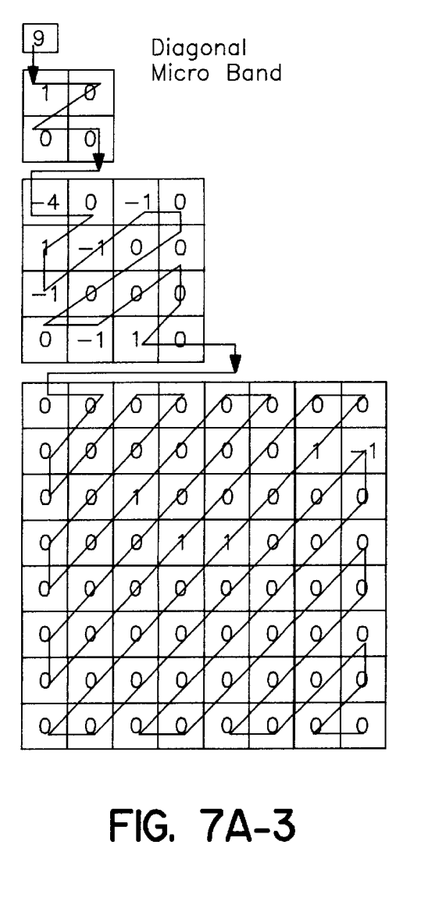
FIG. 7 is an explanation for Adaptive Scanning technique.
Figure 7A:
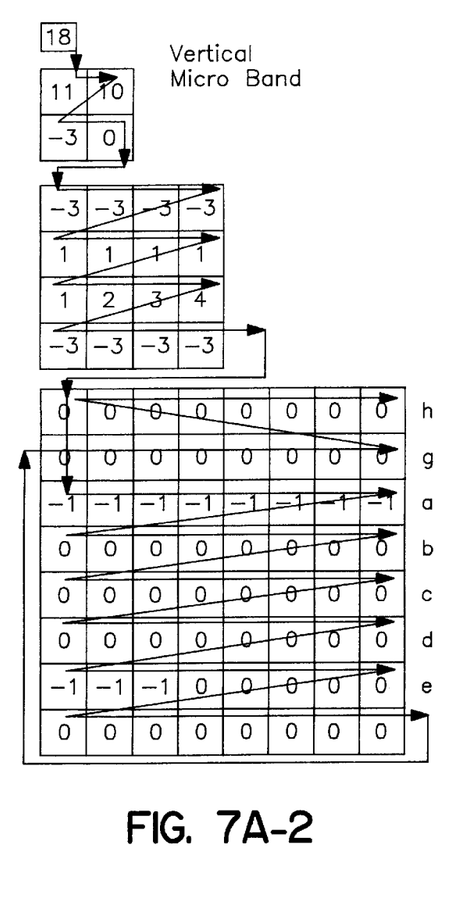
Figure 7A:
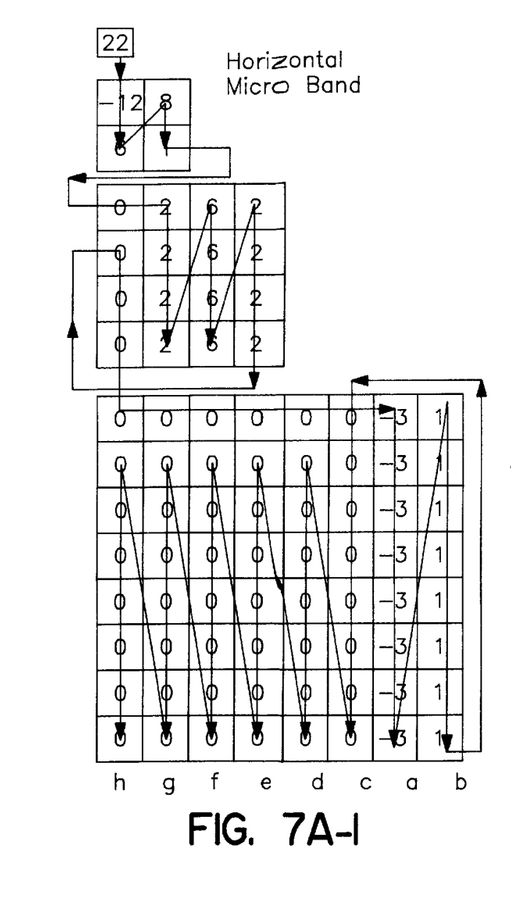
Figure 7B:
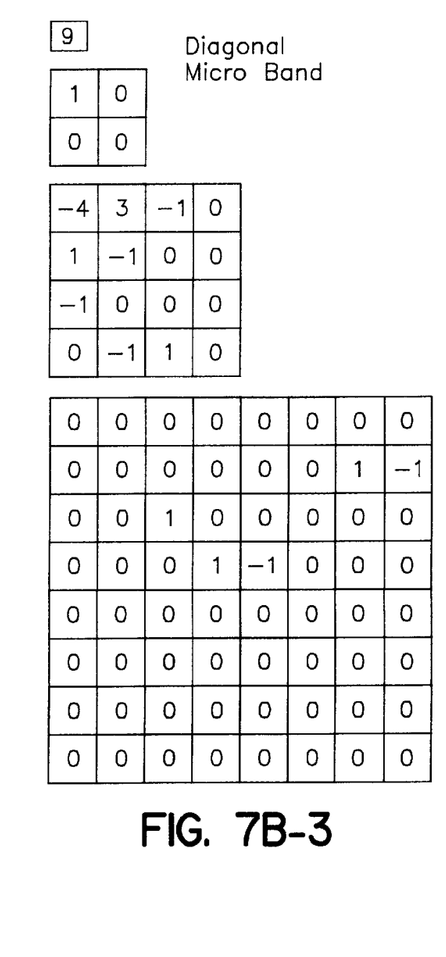
Figure 7B:
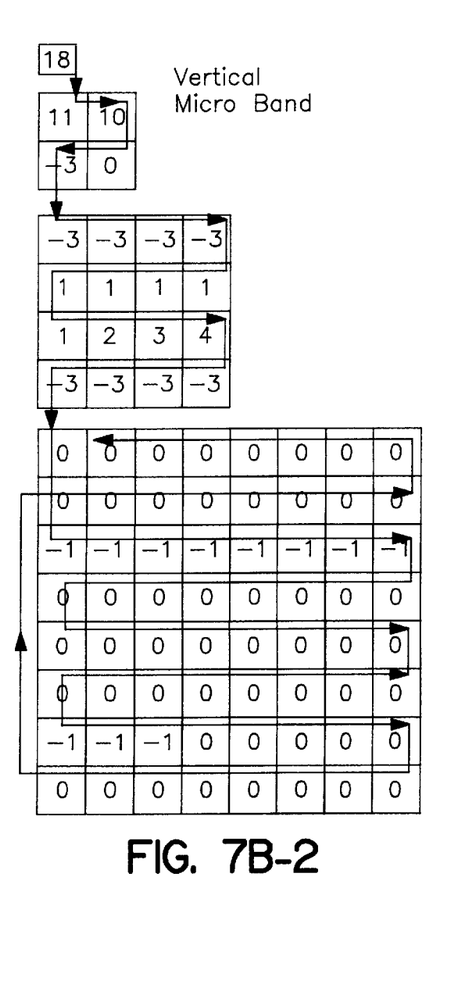
Figure 7B:
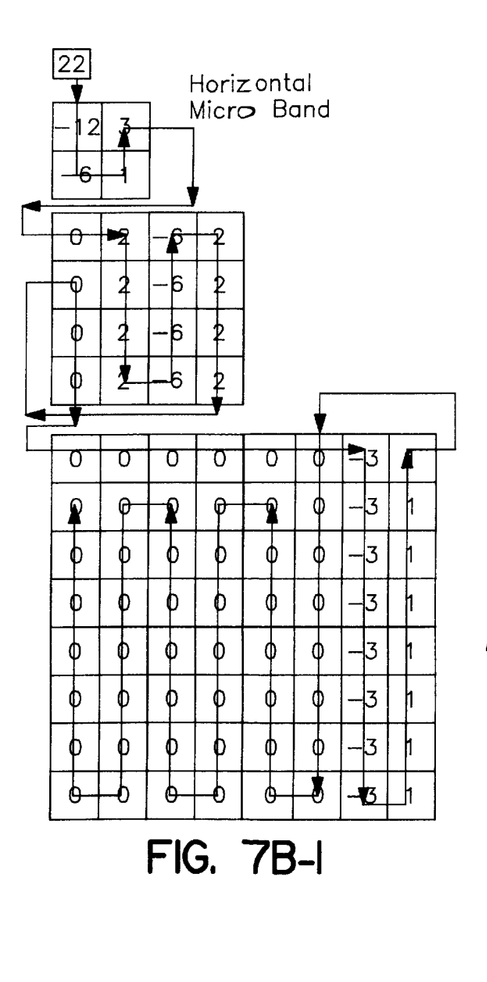

The detailed procedure is shown in FIG. 6 and 7, and in FIG. 6 horizontal bands are taken as an example.

As shown in FIG. 6, in the unit 10 1-D DPCM is applied between neighbour coefficients within the same vertical line for a horizontal band, for example 4×4, or 8×8. Then in the unit 11 the first vertical line with non-zero coefficients in its first value will be searched, shown in FIG. 7.

Taking 8×8 as an example, shown in FIG. 7 (a), searching is done along the first horizontal line until the first non-zero coefficient is found, i.e., the coefficient of "3" for Horizontal Macro Band, then in the unit 12 just by starting from that coefficient, scanning will be done vertically for that line, followed by next vertical line, formed the order of a, b, c, d, e, f, g, h, as shown in FIG. 7 (a).

FIG. 7 (a) is forward adaptive scanning method, and FIG. 7 (b) is continuous adaptive scanning method.

Figure 8:
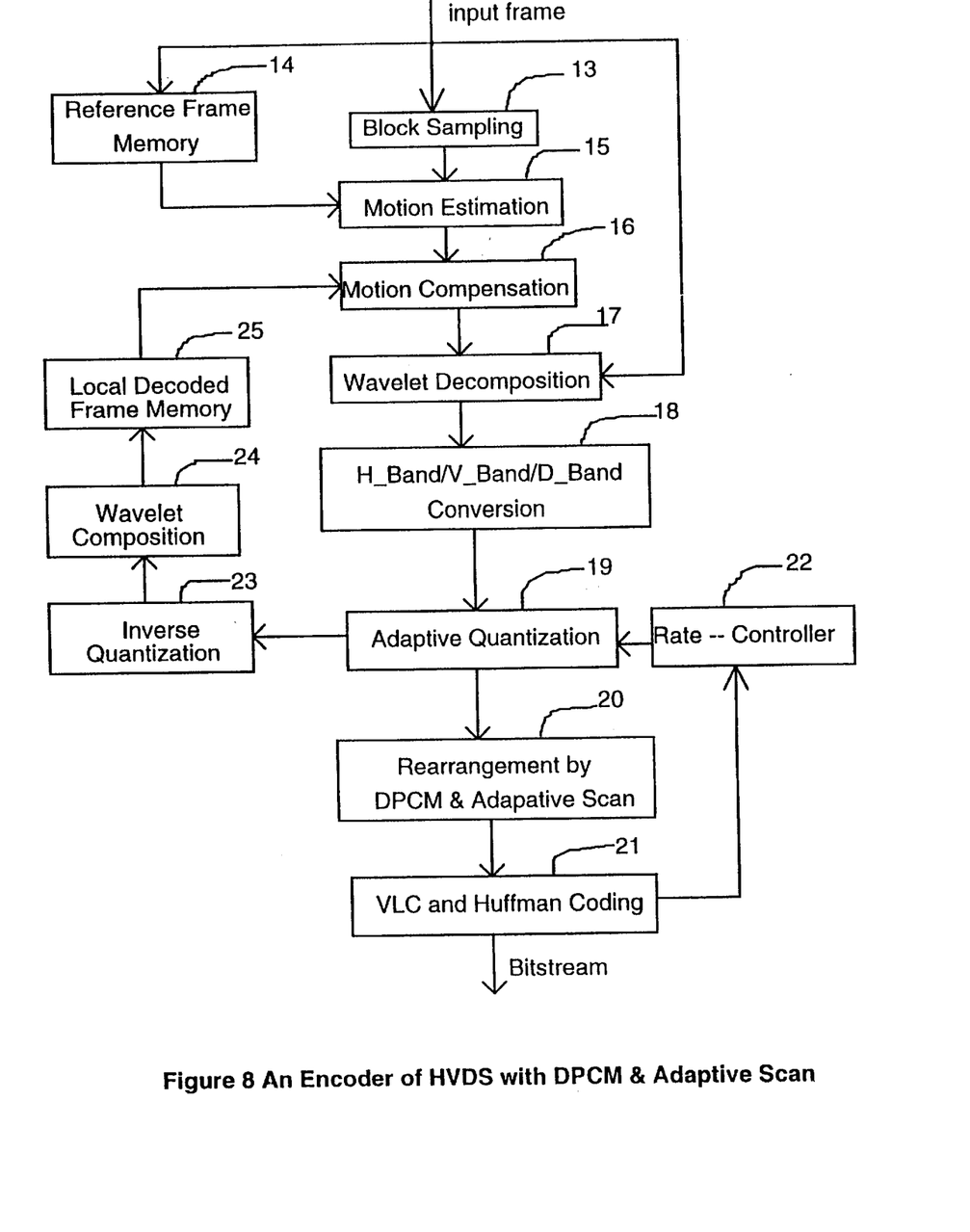
FIG. 8 is an encoder of Wavelet Coding by using HVDS with DPCM & Adaptive Scanning.

In FIG. 8 it is shown that H_Band/V_Band/D_Band Scan (also called HVDS) with DPCM & Adaptive scanning is used in an encoder.

As shown in FIG. 8, an input frame is input into Block Sampling in the unit 13, and subjected to Motion Estimation in the unit 15, and motion Compensation in the unit 16. In the unit 14 Reference Frame Memory stores previous frame for motion estimation.

Wavelet Decomposition is done in the unit of 17 for original image, as well as for motion compensated image from the unit of 16.

In the unit of 18, H_Band/V_Band/D_Band Scan is applied to wavelet coefficients from the unit of 17, then an Adaptive Quantization in the unit of 19 is used here, which is adjusted by the unit of 22, Rate-Controller.

In the unit of 20 Rearrangement by DPCM Coding & Adaptive Scanning is done for the coefficients quantized in the unit of 19.

VLC and Huffman Coding is done in the unit of 21, and the coded bitstream is output from the unit of 21.

An inverse process: Inverse Quantization, Wavelet Composition, are shown in the unit of 23 and 24, respectively. In the unit of 25 Local Decoded Frame Memory is used to store local decoded images for motion compensation.

The invention can improve the coding efficiency of wavelet, especially when used together with H_Band/V_Band/D_Band Scan. Compared with the raster scan employed in H_Band/V_Band/D_Band Scan previously, the DPCM & Adaptive Scan presented in the invention has 1.7% to 9.7% bit saving for different images, which are table tennis, flower garden, susie, foreman, mother & daughter, carphone and claire.

In any cases where wavelet or subband is applied to code images, it can be found that non-zero coefficients are vertically distributed in horizontal bands, and horizontally distributed in vertical bands. The concept of the invention could be applied to scan these coefficients to make bit use as less as possible no matter what the following coding method, i.e., entropy coding, is. That is to say, a rearrangement process for those coefficients could be done by use of the concept presented in the invention, before any following coding method, such as Huffman VLC, arithmetic coding, vector coding, is used.

The method of the invention becomes more efficient when there are a lot of vertical or horizontal edges in an original image, since it can save a lot of bits in that case, in the same time the coded picture quality would be improved much accordingly.

The concept of the invention is also very useful when we study what is the most efficient scanning method for wavelet coefficients, because it tells us that non-zero coefficients are distributed vertically in horizontal bands, and distributed horizontally in vertical bands, so that we could have a good scanning method to be combined with the idea of the invention.

What is claimed is:

1. A video coding method using wavelets with an adaptive scanning method comprising the steps of:

subjecting an input video signal to wavelet decomposition to obtain base, horizontal, vertical and diagonal bands of wavelet coefficients;

subjecting the resulting base band to further wavelet decomposition to obtain lower layers of base, horizontal, vertical and diagonal bands of wavelet coefficients;

grouping co-sited coefficients from the layers of horizontal, vertical and diagonal bands into a plurality of horizontal, vertical and diagonal macro-bands, respectively;

adaptively scanning the coefficients in said macro-bands into a plurality of one dimensional arrays by:
1) for each horizontal macro-band, horizontally scanning the first column at the beginning of each horizontal band until a non-zero coefficient is found, and vertically scanning the remainder of the coefficients in each horizontal band by starting from the next vertical coefficient from said non-zero coefficient, and wrapping around to the coefficients that have not been scanned before proceeding to the next band,
2) for each vertical macro-band, vertically scanning the first row at the beginning of each vertical band until a non-zero coefficient is found, and horizontally scanning the remainder of the coefficients in each vertical band by starting from the next horizontal coefficient from said non-zero coefficient, and wrapping around to the coefficients that have not been scanned before proceeding to the next band, and
3) one of zig-zag scanning and raster scanning each diagonal macro-band; and
entropy coding each of said one dimensional arrays.

2. A video coding method according to claim 1, wherein the step of grouping the wavelet co-sited coefficients into macro-bands comprises the steps of:
keeping the lowest layer base band as the Base band, B1b;
taking one coefficient in the lowest layer horizontal band, B1h;
taking 2×2 coefficients in the horizontal band layer which is one layer above the lowest layer, B2h;
taking 4×4 coefficients in the horizontal band layer which is two layers above the lowest layer, B3h;
taking 8×8 coefficients in the horizontal band layer which is three layers above the lowest layer, B4h;
all at the same spatial position to form one of the horizontal macro-bands;
in the same manner,
taking one coefficient in the lowest layer vertical band, B1v;
taking 2×2 coefficients in the vertical band layer which is one layer above the lowest layer, B2v;
taking 4×4 coefficients in the vertical band layer which is two layers above the lowest layer, B3v;
taking 8×8 coefficients in the vertical band layer which is three layers above the lowest layer, B4v;
all at the same spatial position to form one of the vertical macro-bands;
in the same manner,
taking one coefficient in the lowest layer diagonal band, B1d;
taking 2×2 coefficients in the diagonal band layer which is one layer above the lowest layer, B2d;
taking 4×4 coefficients in the diagonal band layer which is two layers above the lowest layer, B3d;
taking 8×8 coefficients in the diagonal band layer which is three layers above the lowest layer, B4d;
all at the same spatial position to form one of the diagonal macro-bands.

3. A video coding method according to claim 1, wherein the step of scanning the macro-bands into one dimensional arrays comprises the steps of:
scanning the horizontal macro-band coefficients vertically from the first coefficient to the last coefficient in each column, column by column starting from the lowest band to the highest band (B1h to B4h);
scanning the vertical macro-band coefficients horizontally from the first coefficient to the last coefficient in each row, row by row starting from the lowest band to the highest band (B1v to B4v); and
scanning the diagonal macro-band coefficients in zig-zag scan manner starting from the lowest band to the highest band (B1d to B4d).

4. A video coding method according to claim 1, wherein the step of scanning the macro-bands into one dimensional arrays comprises the steps of:
alternating scanning the horizontal macro-band coefficients between scanning from the first coefficient to the last coefficient and scanning from the last coefficient to the first coefficient for each successive column in the horizontal macro-band; and
alternating scanning the vertical macro-band coefficients between scanning from the first coefficient to the last coefficient and scanning from the last coefficient to the first coefficient for each successive row in the vertical macro-band.

5. A video coding method according to claim 1, wherein the step of differentially coding includes the step of differentially pulse code modulating the coefficients within each vertical column and horizontal row of the horizontal and vertical macro-bands, respectively.

6. A video coding method according to claim 1, further comprising the steps of:
run length coding said one dimensional arrays to produce a plurality of coded bits;
including the coded bits into a bitstream; and
sending the bitstream to a decoder.

7. A video coding method according to claim 1, wherein wavelet decomposition is replaced therein by a general subband decomposition technique combined with said steps of grouping and scanning.

8. A method for decoding a coded bitstream comprising the steps of:
decoding the coded bitstream into a plurality of one dimensional arrays using Huffman-like run length decoding;
forming macro-bands from said one dimensional arrays by inverse scanning the one dimensional arrays into macro bands by:
(a) for each horizontal macro-band, arranging data elements of said one dimensional arrays in a column,
(b) for each vertical macro-band, arranging data elements of said one dimensional arrays in a row, and
(c) for each diagonal macro-band, arranging data elements of said one dimensional arrays in one of zig-zag scanning and raster scanning pattern;
inversely quantizing the levels in said macro-bands to form a plurality of wavelet coefficients;
reconstructing a plurality of horizontal, vertical and diagonal bands from said macro-bands; and
reconstructing an image using the horizontal, vertical and diagonal bands.

9. A video decoding method according to claim 8, wherein the step of reconstructing the image uses a general subband reconstruction technique.

10. A video decoding method according to claim 8, wherein the step of reconstructing the image includes recursively applying a horizontal and a vertical wavelet reconstruction to the wavelet bands to form the reconstructed image.

11. A video coding method using wavelets with an adaptive scanning method comprising the steps of:

subjecting an input video signal to wavelet decomposition to obtain base, horizontal, vertical and diagonal bands of wavelet coefficients;

subjecting the resulting base band to further wavelet decomposition to obtain lower layers of base, horizontal, vertical and diagonal bands of wavelet coefficients;

grouping co-sited coefficients from the layers of horizontal, vertical and diagonal bands into a plurality of horizontal, vertical and diagonal macro-bands, respectively, by:
1) keeping the lowest layer base band as the Base band, B1b,
2) taking one coefficient in the lowest layer horizontal band, B1h,
3) taking 2×2 coefficients in the horizontal band layer which is one layer above the lowest layer, B2h,
4) taking 4×4 coefficients in the horizontal band layer which is two layers above the lowest layer, B3h,
5) taking 8×8 coefficients in the horizontal band layer which is three layers above the lowest layer, B4h,
6) all at the same spatial position to form one of the horizontal macro-bands,
in the same manner,
7) taking one coefficient in the lowest layer vertical band, B1v,
8) taking 2×2 coefficients in the vertical band layer which is one layer above the lowest layer, B2v,
9) taking 4×4 coefficients in the vertical band layer which is two layers above the lowest layer, B3v,
10) taking 8×8 coefficients in the vertical band layer which is three layers above the lowest layer, B4v,
11) all at the same spatial position to form one of the vertical macro-bands,
in the same manner,
12) taking one coefficient in the lowest layer diagonal band, B1d,
13) taking 2×2 coefficients in the diagonal band layer which is one layer above the lowest layer, B2d,
14) taking 4×4 coefficients in the diagonal band layer which is two layers above the lowest layer, B3d,
15) taking 8×8 coefficients in the diagonal band layer which is three layers above the lowest layer, B4d,
16) all at the same spatial position to form one of the diagonal macro-bands;

adaptively scanning the coefficients in said horizontal, vertical and diagonal macro-bands, respectively, into a plurality of one dimensional arrays;

quantizing each of the plurality of one dimensional arrays; and entropy coding each of said one dimensional arrays.

12. A method for decoding a coded bit stream comprising the steps of:

decoding the coded bit stream into a plurality of one dimensional arrays using Huffman-like run length decoding, each of the plurality of one dimensional arrays having a plurality of data elements;

forming macro-bands from said one dimensional arrays by inverse scanning the one dimensional arrays into macro bands by:
(a) for each horizontal macro-band, arranging data elements of said one dimensional arrays in a column, by determining the position of a first non-zero coefficient column in a current macro-band based on a number of zero coefficients which have not been scanned in a previous band,
(b) for each vertical macro-band, arranging data elements of said one dimensional array in a row, by determining the position of a first non-zero coefficient row in the current macro-band based in the number of zero coefficients which have not been scanned in the previous band, and
(c) for each diagonal macro-band, arranging data elements of said one dimensional arrays in one of a zig-zag scanning pattern and a raster scanning pattern;

inversely quantizing the levels in said macro-bands to form a plurality of wavelet coefficients;

reconstructing a plurality of horizontal, vertical and diagonal bands from said macro-bands; and reconstructing an image using the horizontal, vertical and diagonal bands.

* * * * *

UNITED STATES PATENT AND TRADEMARK OFFICE
CERTIFICATE OF CORRECTION

PATENT NO.   : 6,055,017
DATED        : April 25, 2000
INVENTOR(S)  : Shen et al.

It is certified that error appears in the above-identified patent and that said Letters Patent is hereby corrected as shown below:

Title page,
Item [56] References Cited, insert:

U.S. PATENT DOCUMENTS
5,276,525    1/1994    Gharavi
5,657,085    8/1997    Katto FOREIGN PATENT DOCUMENTS
0 642 272 A2    3/1995    European Patent Off.
0 442 096 A2    8/1991    European Patent Off.
07274168        10/1995   Japan
08186815        7/1996    Japan
EP0817494A2     1/1998    European Patent Off.

OTHER PUBLICATIONS
C. Smith et al., "The Two-Dimensional LMS Algorithm and its Application To Sub-Band Filtering," Image Processing and its Applications, pp. 722-726 (July 1995).

European Search Report dated June 8, 1998 corresponding to EP 97 10 4900.

Signed and Sealed this

Ninth Day of October, 2001

Attest:

NICHOLAS P. GODICI
Attesting Officer    Acting Director of the United States Patent and Trademark Office